United States Patent
Rosenberg et al.

(10) Patent No.: US 11,110,887 B2
(45) Date of Patent: Sep. 7, 2021

(54) VEHICLE SEAT BELT ANCHORAGE LOCATION DEPENDENT ON SEAT BACK RECLINE ANGLE

(71) Applicant: Volvo Car Corporation, Gothenburg (SE)

(72) Inventors: Johan Rosenberg, Lerum (SE); Peter Adolfsson, Hisings Backa (SE)

(73) Assignee: Volvo Car Corporation, Gothenburg (SE)

( * ) Notice: Subject to any disclaimer, the term of this patent is extended or adjusted under 35 U.S.C. 154(b) by 109 days.

(21) Appl. No.: 16/396,946

(22) Filed: Apr. 29, 2019

(65) Prior Publication Data

US 2020/0339062 A1 Oct. 29, 2020

(51) Int. Cl.
*B60R 22/06* (2006.01)
*B60R 22/20* (2006.01)
*B60R 22/26* (2006.01)

(52) U.S. Cl.
CPC .............. *B60R 22/20* (2013.01); *B60R 22/26* (2013.01); *B60R 2022/207* (2013.01); *B60R 2022/208* (2013.01)

(58) Field of Classification Search
CPC ... B60R 22/20; B60R 22/26; B60R 2022/207; B60R 2022/208
USPC ...................................................... 280/801.2
See application file for complete search history.

(56) References Cited

U.S. PATENT DOCUMENTS

| | | | |
|---|---|---|---|
| 4,175,787 A | 11/1979 | Muskat | |
| 4,221,403 A | 9/1980 | Grosser | |
| 9,434,349 B1 * | 9/2016 | Perkins | ................... B60R 22/48 |
| 9,669,796 B2 * | 6/2017 | Ohno | ..................... B60R 22/48 |
| 2002/0089164 A1 | 7/2002 | Rouhana et al. | |
| 2006/0138797 A1 * | 6/2006 | Wang | ................. B60N 2/42745 296/68.1 |
| 2006/0220426 A1 * | 10/2006 | Moffatt | ................ B60N 2/4221 297/216.19 |
| 2008/0296884 A1 | 12/2008 | Rouhana et al. | |
| 2012/0139324 A1 * | 6/2012 | Masutani | ............ B60R 22/1955 297/470 |
| 2015/0258955 A1 * | 9/2015 | Jayasuriya | ......... B61D 33/0028 297/353 |
| 2017/0267207 A1 | 9/2017 | Pisaniello et al. | |

* cited by examiner

*Primary Examiner* — Toan C To
(74) *Attorney, Agent, or Firm* — Clements Bernard Walker; Christopher L. Bernard (57) ABSTRACT

A seat belt anchorage assembly adapted to be coupled to an interior structure (e.g., a seat) of a vehicle, including: a seat belt attachment point adapted to receive one of a seat belt retention assembly and a seat belt buckle assembly; a translation mechanism coupled to the seat belt attachment point and adapted to translate the seat belt attachment point one or more of forwards and downwards with respect to the interior structure (e.g., the seat) of the vehicle responsive to a seat back of the vehicle being reclined. Optionally, the translation mechanism includes a mechanical linkage coupled between the seat back and the seat belt attachment point. Alternatively, the translation mechanism includes an electronic actuator coupled between the seat back and the seat belt attachment point.

20 Claims, 3 Drawing Sheets

VEHICLE SEAT BELT ANCHORAGE LOCATION DEPENDENT ON SEAT BACK RECLINE ANGLE

TECHNICAL FIELD

The present disclosure relates generally to the automotive field. More particularly, the present disclosure relates to a seat belt anchorage location that is dependent on a seat back recline angle.

BACKGROUND

In general, a seat belt in a vehicle is most effective when an occupant is seated in an upright configuration. In such an upright configuration, the lap belt is properly coupled to the hip structure of the occupant and the shoulder belt is properly coupled with the chest and shoulder structures of the occupant. It is becoming increasingly common, however, for occupants to be seated in a reclined configuration for comfort and convenience, especially as autonomous driving (AD) systems become more prevalent, diminishing the need for the occupant to be continuously attentive to the operation of the vehicle. In such a reclined configuration, with the seat back disposed at a larger angle, a, relative to vertical, it becomes possible for the occupant to submarine under the seat belt during a braking or impact event, potentially resulting in injury.

Figure 1:
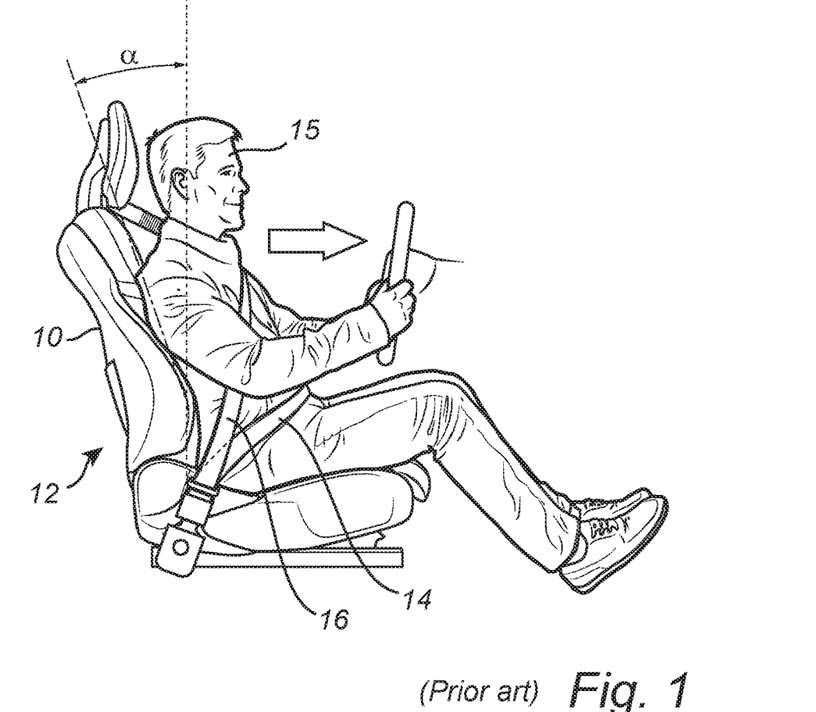
FIG. 1 is a schematic diagram illustrating the operation of a conventional seat belt assembly with respect to occupant submarining in the event of a vehicle braking or impact event, showing the occupant in an upright configuration.
Figure 2:
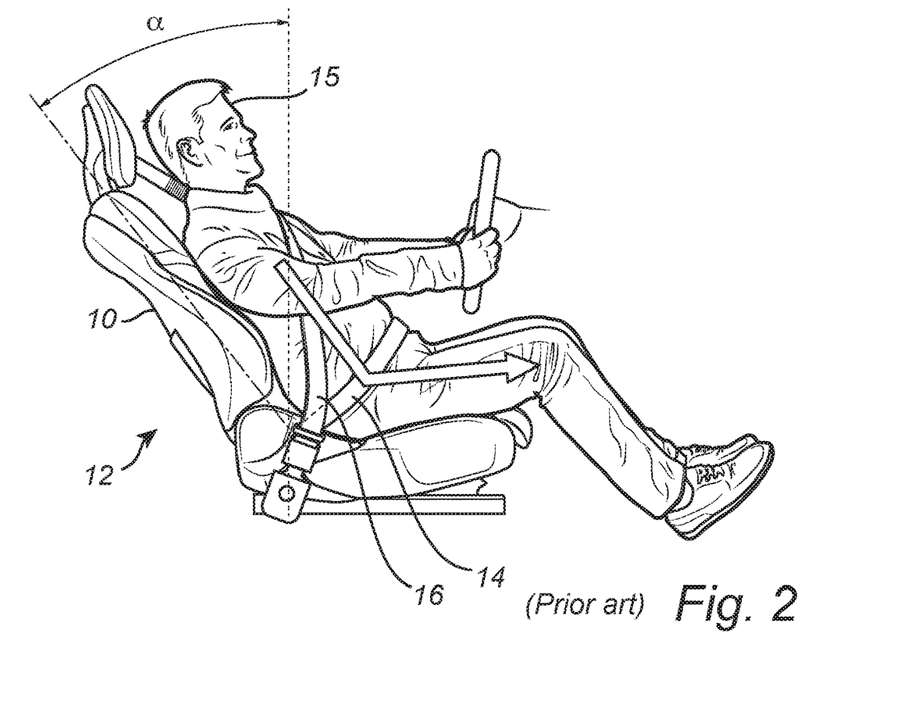
FIG. 2 is another schematic diagram illustrating the operation of a conventional seat belt assembly with respect to occupant submarining in the event of a vehicle braking or impact event, showing the occupant in a reclined configuration.

Such submarining is illustrated in FIGS. 1 and 2. Referring to FIG. 1, in an upright configuration, with smaller a recline of the seat back 10 of the seat 12, the lap belt 14 is fully coupled to the hip structure of the occupant 15 and the shoulder belt 16 is fully coupled with the chest and shoulder structures of the occupant 15. The occupant 15 is thereby prevented from sliding under the lap belt 14 and shoulder belt 16 during a braking or impact event and submarining is avoided. Referring to FIG. 2, in a reclined configuration, with larger a recline of the seat back 10 of the seat 12, the lap belt 14 is not fully coupled to the hip structure of the occupant 15 and the shoulder belt 16 is not fully coupled with the chest and shoulder structures of the occupant 15. The occupant 15 is thereby allowed to slide under the lap belt 14 and shoulder belt 16 during a braking or impact event and submarining is possible. Again, injury may result, as the lap belt 14 may contact internal organs of the occupant 15 and the shoulder belt 16 may contact the neck and head of the occupant 15 during submarining.

A variety of seat belt configurations and auto-upright seat back mechanisms have been developed to deal with this problem of submarining, however none developed to date are adequate.

SUMMARY

In the present disclosure, it is recognized that, in a reclined configuration, an occupant is more properly restrained by the lap and shoulder belts of a vehicle seat if the lower seat belt anchorage point(s) on one or both sides of the seat are positioned forward of and below the nominal design location(s). With the seat belt anchorage point(s) positioned forward of and below the nominal design location(s), the lap belt is more fully coupled to the hip structure of the occupant and the shoulder belt is more fully coupled with the chest and shoulder structures of the occupant and submarining is prevented. Thus, the present disclosure provides a mechanism for transitioning one or both of these seat belt anchorage points from these nominal design locations to these preferred positions when the seat back is transitioned from an upright configuration to a reclined configuration, and vice versa. This mechanism can operate passively when the seat back is reclined at any time, for example, or actively when the seat back is reclined and a braking or impact event is detected, at which time an appropriate locking mechanism may also be deployed. It will be appreciated that the mechanism can be applied to either or both of the belt anchor assembly of the seat belt system and the buckle anchor assembly of the seat belt system. With the seat belt anchorage point(s) positioned forward of and below the nominal design location(s), the lap belt more fully coupled to the hip structure of the occupant, and the shoulder belt is more fully coupled with the chest and shoulder structures of the occupant, the risk for occupant injury due to submarining during a braking or impact event is desirably mitigated.

In one exemplary embodiment, the present disclosure provides a seat belt anchorage assembly adapted to be coupled to an interior structure of a vehicle, the seat belt anchorage assembly including: a seat belt attachment point adapted to receive one of a seat belt retention assembly and a seat belt buckle assembly; a translation mechanism coupled to the seat belt attachment point and adapted to translate the seat belt attachment point one or more of forwards and downwards with respect to the interior structure of the vehicle responsive to a seat back of the vehicle being reclined. Optionally, the translation mechanism includes a mechanical linkage coupled between the seat back and the seat belt attachment point. Optionally, the mechanical linkage includes: a first arm member coupled to the seat back and adapted to pivot with the seat back when the seat back is reclined; a second arm member pivotably coupled to the first arm member opposite the seat back; and a third arm member pivotably coupled to the second arm member at one end of the third arm member and pivotably coupled to the interior structure of the vehicle at an opposite end of the third arm member; wherein the one end of the third arm member corresponds to the seat belt attachment point and is adapted to translate one or more of forwards and downwards with respect to the interior structure of the vehicle responsive to the seat back being reclined. Alternatively, the translation mechanism includes an electronic actuator coupled between the seat back and the seat belt attachment point. Optionally, the electronic actuator includes: a sensor mechanism adapted to sense a recline angle, a, of the seat back; and an actuation mechanism coupled to the sensor mechanism and adapted to translate the seat belt attachment point one or more of forwards and downwards with respect to the interior structure of the vehicle responsive to the seat back being reclined. The seat belt anchorage assembly further includes a housing disposed about the translation mechanism and adapted to provide access to the seat belt attachment point such that the one of the seat belt retention assembly and the seat belt buckle assembly can be coupled to the seat belt attachment point. Optionally, the translation mechanism is adapted to translate the seat belt attachment point one or more of forwards and downwards with respect to the interior structure of the vehicle responsive to the seat back of the vehicle being reclined and an electronic control system of the vehicle detecting an impending braking or impact event. Optionally, the seat belt anchorage assembly further includes a locking mechanism adapted to secure the seat belt attachment point in place when the seat belt attachment point is translated one or more of forwards and downwards with respect to the interior structure of the vehicle. Optionally, the locking mechanism is adapted to secure the seat belt attachment point in place when the seat belt attachment point is translated one or more of forwards and downwards with respect to the interior structure of the vehicle responsive to an electronic control system of the vehicle detecting an impending braking or impact event.

In another exemplary embodiment, the present disclosure provides a seat assembly adapted to be coupled to an interior structure of a vehicle, the seat assembly including: a seat bottom structure; a seat back structure; a seat belt attachment point adapted to receive one of a seat belt retention assembly and a seat belt buckle assembly; and a translation mechanism coupled between the seat back structure and the seat belt attachment point and adapted to translate the seat belt attachment point one or more of forwards and downwards with respect to the interior structure of the vehicle responsive to the seat back structure being reclined. Optionally, the translation mechanism includes a mechanical linkage coupled between the seat back structure and the seat belt attachment point. Optionally, the mechanical linkage includes: a first arm member coupled to the seat back structure and adapted to pivot with the seat back structure when the seat back structure is reclined; a second arm member pivotably coupled to the first arm member opposite the seat back structure; and a third arm member pivotably coupled to the second arm member at one end of the third arm member and pivotably coupled to one or more of the seat bottom structure and the interior structure of the vehicle at an opposite end of the third arm member; wherein the one end of the third arm member corresponds to the seat belt attachment point and is adapted to translate one or more of forwards and downwards with respect to the interior structure of the vehicle responsive to the seat back structure being reclined. Alternatively, the translation mechanism includes an electronic actuator coupled between the seat back structure and the seat belt attachment point. Optionally, the electronic actuator includes: a sensor mechanism adapted to sense a recline angle, a, of the seat back structure; and an actuation mechanism coupled to the sensor mechanism and adapted to translate the seat belt attachment point one or more of forwards and downwards with respect to the interior structure of the vehicle responsive to the seat back structure being reclined. The seat assembly further includes a housing disposed about the translation mechanism and adapted to provide access to the seat belt attachment point such that the one of the seat belt retention assembly and the seat belt buckle assembly can be coupled to the seat belt attachment point. Optionally, the translation mechanism is adapted to translate the seat belt attachment point one or more of forwards and downwards with respect to the interior structure of the vehicle responsive to the seat back structure of the vehicle being reclined and an electronic control system of the vehicle detecting an impending braking or impact event. Optionally, the seat assembly further includes a locking mechanism adapted to secure the seat belt attachment point in place when the seat belt attachment point is translated one or more of forwards and downwards with respect to the interior structure of the vehicle. Optionally, the locking mechanism is adapted to secure the seat belt attachment point in place when the seat belt attachment point is translated one or more of forwards and downwards with respect to the interior structure of the vehicle responsive to an electronic control system of the vehicle detecting an impending braking or impact event.

In a further exemplary embodiment, the present disclosure provides a non-transitory computer readable medium stored on a computer and executed by a processor to implement the step(s) including: responsive to a seat back of a vehicle being reclined, actuating a translation mechanism coupled to a seat belt attachment point to translate the seat belt attachment point one or more of forwards and downwards with respect to an interior structure of the vehicle; wherein the seat belt attachment point adapted to receive one of a seat belt retention assembly and a seat belt buckle assembly. Optionally, the translation mechanism includes an electronic actuator coupled between the seat back and the seat belt attachment point, and wherein the electronic actuator includes: a sensor mechanism adapted to sense a recline angle, $\alpha$, of the seat back; and an actuation mechanism coupled to the sensor mechanism and adapted to translate the seat belt attachment point one or more of forwards and downwards with respect to the interior structure of the vehicle responsive to the seat back being reclined. Optionally, the translation mechanism is actuated to translate the seat belt attachment point one or more of forwards and downwards with respect to the interior structure of the vehicle responsive to the seat back of the vehicle being reclined and an electronic control system of the vehicle detecting an impending braking or impact event. Optionally, the steps further include actuating a locking mechanism to secure the seat belt attachment point in place when the seat belt attachment point is translated one or more of forwards and downwards with respect to the interior structure of the vehicle responsive to the seat back of the vehicle being reclined and an electronic control system of the vehicle detecting an impending braking or impact event.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, in the present disclosure, it is recognized that, in a reclined configuration, an occupant is more properly restrained by the lap and shoulder belts of a vehicle seat if the lower seat belt anchorage point(s) on one or both sides of the seat are positioned forward of and below the nominal design location(s). With the seat belt anchorage point(s) positioned forward of and below the nominal design location(s), the lap belt is more fully coupled to the hip structure of the occupant and the shoulder belt is more fully coupled with the chest and shoulder structures of the occupant and submarining is prevented. Thus, the present disclosure provides a mechanism for transitioning one or both of these seat belt anchorage points from these nominal design locations to these preferred positions when the seat back is transitioned from an upright configuration to a reclined configuration, and vice versa. This mechanism can operate passively when the seat back is reclined at any time, for example, or actively when the seat back is reclined and a braking or impact event is detected, at which time an appropriate locking mechanism may also be deployed. It will be appreciated that the mechanism can be applied to either or both of the belt anchor assembly of the seat belt system and the buckle anchor assembly of the seat belt system. With the seat belt anchorage point(s) positioned forward of and below the nominal design location(s), the lap belt more fully coupled to the hip structure of the occupant, and the shoulder belt is more fully coupled with the chest and shoulder structures of the occupant, the risk for occupant injury due to submarining during a braking or impact event is desirably mitigated.

Figure 3:
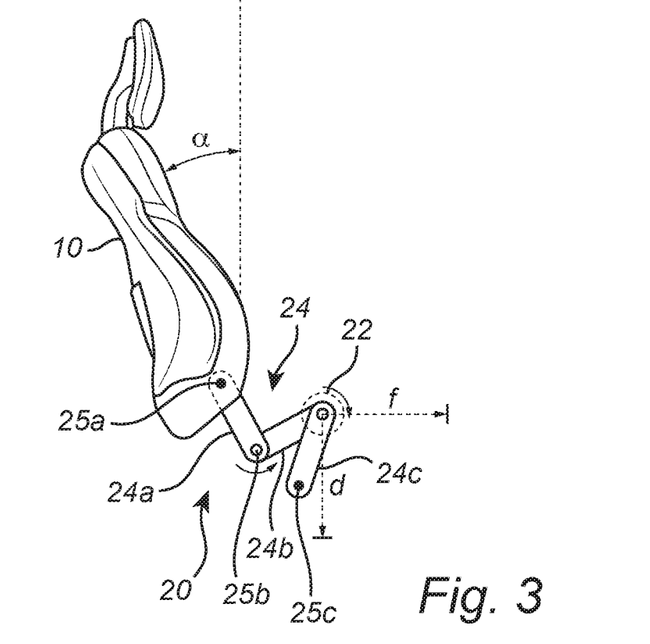
FIG. 3 a schematic diagram illustrating the operation of one exemplary embodiment of the vehicle seat belt assembly of the present disclosure, the seat belt assembly utilizing a passive mechanical linkage to adjust the seat belt anchorage point(s) with the reclining of the associated seat back.

Referring now specifically to FIG. 3, in one exemplary embodiment, the seat belt anchorage assembly 20 of the present disclosure is adapted to be coupled to an interior structure of a vehicle. For example, the seat belt anchorage assembly 20 can be a stand-alone assembly that is coupled to the seat assembly, seat frame assembly, a floor structure, and/or a pillar structure of the vehicle. Preferably, the seat belt anchorage assembly 20 is ultimately secured to the floor structure and/or pillar structure of the vehicle such that adequate retention strength is provided to the vehicle occupant 15 (FIGS. 1 and 2) through the lap belt 14 (FIGS. 1 and 2) and shoulder belt 16 (FIGS. 1 and 2) in the event of a braking or impact event. Alternatively, the seat belt anchorage assembly 20 can be provided as a part of the seat assembly and/or seat frame assembly. The seat belt anchorage assembly 20 generally includes a seat belt attachment point 22 that is adapted to receive one of a seat belt retention assembly and a seat belt buckle assembly. This seat belt attachment point 22 may consist of a smooth or threaded hole defined by a surrounding structure, a metallic retention structure, and/or a multi component retention assembly, any of which are suitable for receiving and securing the seat belt retention assembly on a lower interior side of the associated seat assembly and/or seat frame assembly, for example, or the seat belt buckle assembly on a lower outboard side of the associated seat assembly and/or seat frame assembly, for example. By way of illustration only, the seat belt attachment point 22 may consist of a threaded bolt hole to which a seat belt retainer is fastened near the floor between the B-pillar and seat of the vehicle. Likewise, the seat belt attachment point 22 may consist of a metallic C-ring to which a seat belt buckle is fastened near the floor between the center tunnel or console and seat of the vehicle.

The seat belt anchorage assembly 20 also includes a translation mechanism 24 coupled to or including the seat belt attachment point 22 and adapted to translate the seat belt attachment point 22 one or more of forwards and downwards with respect to the interior structure of the vehicle responsive to the seat back 10 of the vehicle being reclined. Preferably, the seat belt attachment point 22 is translated both forwards and downwards, by distances f and d, respectively, with respect to the interior structure of the vehicle proportionally responsive to the seat back 10 of the vehicle being reclined. In this exemplary embodiment, the translation mechanism 24 includes a mechanical linkage coupled between the seat back 10 and the seat belt attachment point 22 and acts in a passive manner, actuating simultaneously with the reclining of the seat back 10. The mechanical linkage includes a first arm member 24a coupled to the seat back 10 and adapted to pivot with the seat back 10 about a first fixed pivot point 25a when the seat back 10 is reclined. Thus, the first arm member 24a essentially acts as a counter-pivoting extension of the seat back 10 about the first fixed pivot point 25a, pivoting forwards and upwards when the seat back 10 is reclined rearwards and downwards. A second arm member 24b is pivotably coupled at a second movable pivot point 25b to the first arm member 24a, opposite the seat back 10. A third arm member 24c is pivotably coupled at the movable seat belt attachment point 22 to the second arm member 24b at one end of the third arm member 24c and pivotably coupled at a fourth fixed pivot point 25c to the interior structure of the vehicle at an opposite end of the third arm member 24c. Again, the movable pivot point between the second arm member 24b and the third arm member 24c corresponds to the seat belt attachment point 22 and is adapted to translate one or more of forwards and downwards, by distances f and d, respectively, with respect to the interior structure of the vehicle responsive to the seat back 10 being reclined. It will be readily apparent to those of ordinary skill in the art than any or all of the arm members 24a, 24b, 24c consist of substantially rigid structures, such as metallic structures, that may have any suitable shape(s). For example, elongate arm structures can be utilized, bell crank structures can be utilized, etc. It will also be readily apparent to those of ordinary skill in the art that other suitable mechanisms can be utilized equally, provided that the reclining of the seat back 10 is translated into a forward and downward pitching of the seat belt attachment point 22, as illustrated and described.

Figure 4:
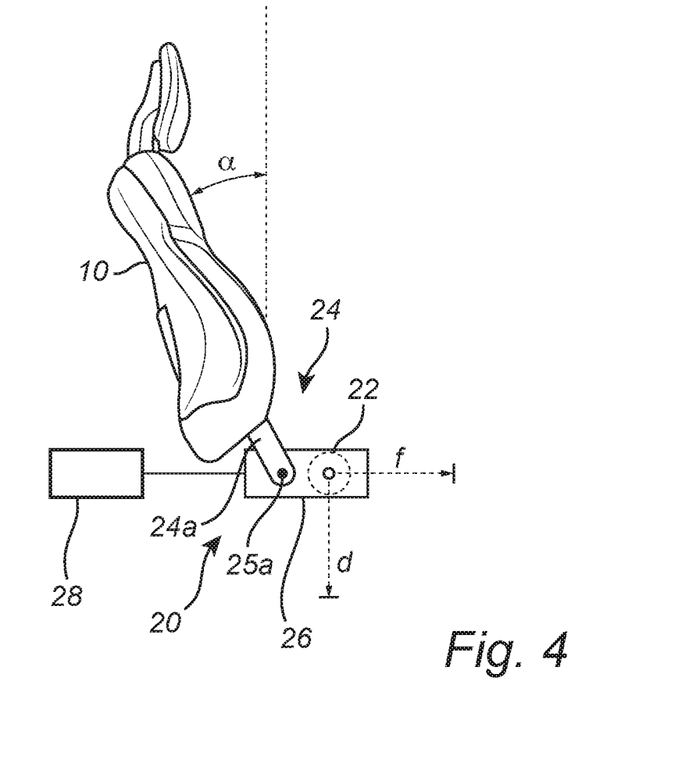
FIG. 4 a schematic diagram illustrating the operation of another exemplary embodiment of the vehicle seat belt assembly of the present disclosure, the seat belt assembly utilizing an active electronic linkage to adjust the seat belt anchorage point(s) with the reclining of the associated seat back.

Referring now specifically to FIG. 4, in another exemplary embodiment, the seat belt anchorage assembly 20 of the present disclosure is again adapted to be coupled to an interior structure of a vehicle. For example, the seat belt anchorage assembly 20 can be a stand-alone assembly that is coupled to the seat assembly, seat frame assembly, a floor structure, and/or a pillar structure of the vehicle. Preferably, the seat belt anchorage assembly 20 is ultimately secured to the floor structure and/or pillar structure of the vehicle such that adequate retention strength is provided to the vehicle occupant 15 (FIGS. 1 and 2) through the lap belt 14 (FIGS. 1 and 2) and shoulder belt 16 (FIGS. 1 and 2) in the event of a braking or impact event. Alternatively, the seat belt anchorage assembly 20 can be provided as a part of the seat assembly and/or seat frame assembly. The seat belt anchorage assembly 20 generally includes a seat belt attachment point 22 that is adapted to receive one of a seat belt retention assembly and a seat belt buckle assembly. This seat belt attachment point 22 may consist of a smooth or threaded hole defined by a surrounding structure, a metallic retention structure, and/or a multi component retention assembly, any of which are suitable for receiving and securing the seat belt retention assembly on a lower interior side of the associated seat assembly and/or seat frame assembly, for example, or the seat belt buckle assembly on a lower outboard side of the associated seat assembly and/or seat frame assembly, for example. By way of illustration only, the seat belt attachment point 22 may consist of a threaded bolt hole to which a seat belt retainer is fastened near the floor between the B-pillar and seat of the vehicle. Likewise, the seat belt attachment point 22 may consist of a metallic C-ring to which a seat belt buckle is fastened near the floor between the center tunnel or console and seat of the vehicle.

Again, the seat belt anchorage assembly 20 also includes a translation mechanism 24 coupled to or including the seat belt attachment point 22 and adapted to translate the seat belt attachment point 22 one or more of forwards and downwards with respect to the interior structure of the vehicle responsive to the seat back 10 of the vehicle being reclined. Preferably, the seat belt attachment point 22 is translated both forwards and downwards, by distances f and d, respectively, with respect to the interior structure of the vehicle proportionally responsive to the seat back 10 of the vehicle being reclined. In this exemplary embodiment, the translation mechanism 24 includes a partially or fully electronic actuator 26 coupled between the seat back 10 and the seat belt attachment point 22 and acts in a passive and/or active manner, actuating simultaneously with the reclining of the seat back 10 and/or actuating upon the detection of an impending or occurring braking or impact event based on the recline angle, a, of the seat back 10 at the time. Optionally, the partially electronic actuator 26 includes a first arm member 24a coupled to the seat back 10 and adapted to pivot with the seat back 10 about a first fixed pivot point 25a when the seat back 10 is reclined. The fully electronic actuator 26 includes a sensor mechanism adapted to sense the recline angle, a, of the seat back 10. In either the partially or fully electronic actuator case, the electronic actuator 26 also includes an actuation mechanism coupled to the first arm member 24a or the sensor mechanism that is adapted to translate the seat belt attachment point 22 one or more of forwards and downwards with respect to the interior structure of the vehicle responsive to the seat back 10 being reclined. Here, the electronic actuator 26 is coupled to an appropriate electronic control unit (ECU) 28 operable for detecting the impending or occurring braking or impact event and actuating the translation mechanism based on the recline angle, a, of the seat back 10 at the time.

Referring now specifically to FIGS. 3 and 4, the translation mechanism 24 of the seat belt anchorage assembly 20 is coupled to and disposed within a seat structure of the vehicle, a console or wall structure of the vehicle, and/or a protective housing to prevent a vehicle occupant 15 from contacting the translation mechanism 24 but provide access to the seat belt attachment point 22, such that the one of the seat belt retention assembly and the seat belt buckle assembly can be coupled to the seat belt attachment point 22.

Referring now specifically to FIG. 4, optionally, the translation mechanism 24 is adapted to translate the seat belt attachment point 22 one or more of forwards and downwards with respect to the interior structure of the vehicle responsive to the seat back 10 of the vehicle being reclined and the ECU 28 of the vehicle detecting an impending braking or impact event. Thus, the seat belt anchorage assembly 20 acts like any other emergency seat positioning system or seat belt pretensioner, preparing the seat belt in advance for an impending impact event, in this case based largely on the recline angle, a, of the seat back 10. In this sense, the seat belt anchorage assembly 20 may act passively at all times and/or wait for a braking or impending impact event and then act as an active emergency system.

Referring again specifically to FIGS. 3 and 4, optionally, the seat belt anchorage assembly 22 further includes a mechanical or electronic locking mechanism adapted to secure the seat belt attachment point 22 in place when the seat belt attachment point 22 is translated one or more of forwards and downwards with respect to the interior structure of the vehicle. This provides the seat belt attachment point 22 with the required degree of structural integrity and strength. This locking mechanism can incorporate a locking pin or other suitable structure that locks the various arm members 24a, 24b, 24c or other mechanical components, or a servo lock or other suitable mechanism that locks the actuator 26 or other electronic components. Optionally, the locking mechanism is adapted to secure the seat belt attachment point 22 in place when the seat belt attachment point 22 is translated one or more of forwards and downwards with respect to the interior structure of the vehicle and responsive to the ECU 28 of the vehicle detecting a braking or impending impact event.

Figure 5:
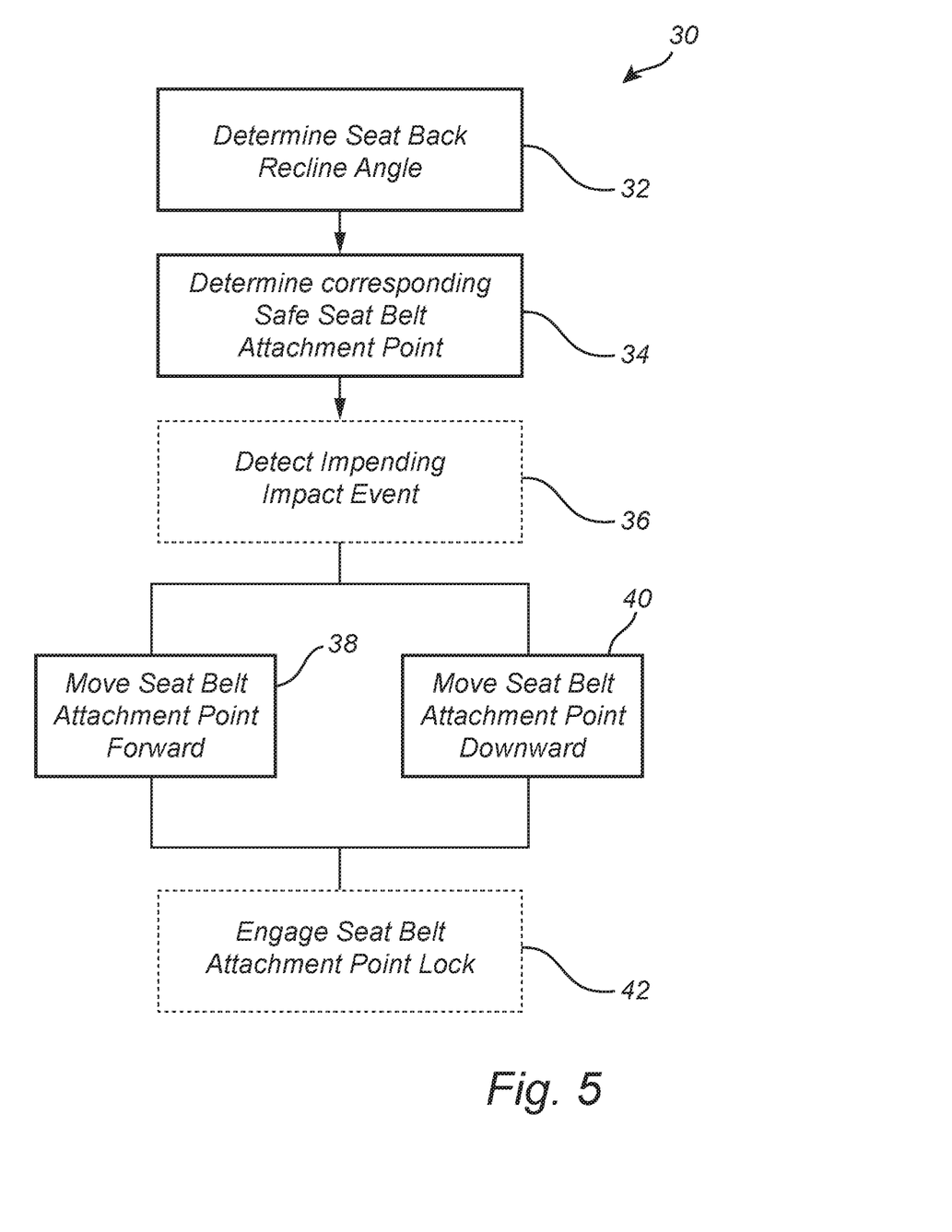
FIG. 5 is a flowchart illustrating one exemplary embodiment of the vehicle seat belt anchorage adjustment method of the present disclosure, the seat belt anchorage adjustment method adjusting the seat belt anchorage point(s) with the reclining of the associated seat back.

Referring now specifically to FIG. 5, in a further exemplary embodiment, the seat belt attachment point adjustment method 30 of the present disclosure includes first sensing, determining, or otherwise utilizing the recline angle, a, of the seat back 10 (FIGS. 1-4) of a vehicle 32. This recline angle, a, is used to set or otherwise determine the appropriate safe position for one or more seat belt attachment points 22 (FIGS. 3 and 4) of the vehicle 34. Optionally, at this point, the ECU 28 (FIG. 4) of the vehicle is also monitoring for a braking or impending impact event 36. Responsive to the recline angle, a, and optionally, responsive to a detected braking or impending impact event, one or more seat belt attachment points 22 are translated forwards with respect to an interior structure of the vehicle by the translation mechanism 24 (FIGS. 3 and 4) 38 and downwards with respect to the interior structure of the vehicle by the translation mechanism 24 40. Optionally, once moved, the seat belt attachment point 22 is locked for structural integrity 42.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus again, in the present disclosure, it is recognized that, in a reclined configuration, an occupant is more properly restrained by the lap and shoulder belts of a vehicle seat if the lower seat belt anchorage point(s) on one or both sides of the seat are positioned forward of and below the nominal design location(s). With the seat belt anchorage point(s) positioned forward of and below the nominal design location(s), the lap belt is more fully coupled to the hip structure of the occupant and the shoulder belt is more fully coupled with the chest and shoulder structures of the occupant and submarining is prevented. Thus, the present disclosure provides a mechanism for transitioning one or both of these seat belt anchorage points from these nominal design locations to these preferred positions when the seat back is transitioned from an upright configuration to a reclined configuration, and vice versa. This mechanism can operate passively when the seat back is reclined at any time, for example, or actively when the seat back is reclined and a braking or impact event is detected, at which time an appropriate locking mechanism may also be deployed. It will be appreciated that the mechanism can be applied to either or both of the belt anchor assembly of the seat belt system and the buckle anchor assembly of the seat belt system. With the seat belt anchorage point(s) positioned forward of and below the nominal design location(s), the lap belt more fully coupled to the hip structure of the occupant, and the shoulder belt is more fully coupled with the chest and shoulder structures of the occupant, the risk for occupant injury due to submarining during a braking or impact event is desirably mitigated.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A seat belt anchorage assembly adapted to be coupled to an interior structure of a vehicle, the seat belt anchorage assembly comprising:
   a seat belt attachment point adapted to receive one of a seat belt retention assembly and a seat belt buckle assembly;
   a translation mechanism coupled to the seat belt attachment point and adapted to translate the seat belt attachment point one or more of forwards and downwards with respect to the interior structure of the vehicle responsive to a seat back of the vehicle being reclined; and
   a locking mechanism adapted to secure the seat belt attachment point in place when the seat belt attachment point is translated one or more of forwards and downwards with respect to the interior structure of the vehicle.

2. The seat belt anchorage assembly of claim 1, wherein the translation mechanism comprises a mechanical linkage coupled between the seat back and the seat belt attachment point.

3. The seat belt anchorage assembly of claim 2, wherein the mechanical linkage comprises:
   a first arm member coupled to the seat back and adapted to pivot with the seat back when the seat back is reclined;
   a second arm member pivotably coupled to the first arm member opposite the seat back; and
   a third arm member pivotably coupled to the second arm member at one end of the third arm member and pivotably coupled to the interior structure of the vehicle at an opposite end of the third arm member;
   wherein the one end of the third arm member corresponds to the seat belt attachment point and is adapted to translate one or more of forwards and downwards with respect to the interior structure of the vehicle responsive to the seat back being reclined.

4. The seat belt anchorage assembly of claim 1, wherein the translation mechanism comprises an electronic actuator coupled between the seat back and the seat belt attachment point.

5. The seat belt anchorage assembly of claim 4, wherein the electronic actuator comprises:
   a sensor mechanism adapted to sense a recline angle, a, of the seat back; and
   an actuation mechanism coupled to the sensor mechanism and adapted to translate the seat belt attachment point one or more of forwards and downwards with respect to the interior structure of the vehicle responsive to the seat back being reclined.

6. The seat belt anchorage assembly of claim 1, further comprising a housing disposed about the translation mechanism and adapted to provide access to the seat belt attachment point such that the one of the seat belt retention assembly and the seat belt buckle assembly can be coupled to the seat belt attachment point.

7. The seat belt anchorage assembly of claim 1, wherein the translation mechanism is adapted to translate the seat belt attachment point one or more of forwards and downwards with respect to the interior structure of the vehicle responsive to the seat back of the vehicle being reclined and an electronic control system of the vehicle detecting an impending braking or impact event.

8. The seat belt anchorage assembly of claim 1, wherein the locking mechanism is adapted to secure the seat belt attachment point in place when the seat belt attachment point is translated one or more of forwards and downwards with respect to the interior structure of the vehicle responsive to an electronic control system of the vehicle detecting an impending braking or impact event.

9. A seat assembly adapted to be coupled to an interior structure of a vehicle, the seat assembly comprising:
a seat bottom structure;
a seat back structure;
a seat belt attachment point adapted to receive one of a seat belt retention assembly and a seat belt buckle assembly;
a translation mechanism coupled between the seat back structure and the seat belt attachment point and adapted to translate the seat belt attachment point one or more of forwards and downwards with respect to the interior structure of the vehicle responsive to the seat back structure being reclined; and
a locking mechanism adapted to secure the seat belt attachment point in place when the seat belt attachment point is translated one or more of forwards and downwards with respect to the interior structure of the vehicle.

10. The seat assembly of claim 9, wherein the translation mechanism comprises a mechanical linkage coupled between the seat back structure and the seat belt attachment point.

11. The seat assembly of claim 10, wherein the mechanical linkage comprises:
a first arm member coupled to the seat back structure and adapted to pivot with the seat back structure when the seat back structure is reclined;
a second arm member pivotably coupled to the first arm member opposite the seat back structure; and
a third arm member pivotably coupled to the second arm member at one end of the third arm member and pivotably coupled to one or more of the seat bottom structure and the interior structure of the vehicle at an opposite end of the third arm member;
wherein the one end of the third arm member corresponds to the seat belt attachment point and is adapted to translate one or more of forwards and downwards with respect to the interior structure of the vehicle responsive to the seat back structure being reclined.

12. The seat assembly of claim 9, wherein the translation mechanism comprises an electronic actuator coupled between the seat back structure and the seat belt attachment point.

13. The seat assembly of claim 12, wherein the electronic actuator comprises:
a sensor mechanism adapted to sense a recline angle, a, of the seat back structure; and
an actuation mechanism coupled to the sensor mechanism and adapted to translate the seat belt attachment point one or more of forwards and downwards with respect to the interior structure of the vehicle responsive to the seat back structure being reclined.

14. The seat assembly of claim 9, further comprising a housing disposed about the translation mechanism and adapted to provide access to the seat belt attachment point such that the one of the seat belt retention assembly and the seat belt buckle assembly can be coupled to the seat belt attachment point.

15. The seat assembly of claim 9, wherein the translation mechanism is adapted to translate the seat belt attachment point one or more of forwards and downwards with respect to the interior structure of the vehicle responsive to the seat back structure of the vehicle being reclined and an electronic control system of the vehicle detecting an impending braking or impact event.

16. The seat assembly of claim 9, wherein the locking mechanism is adapted to secure the seat belt attachment point in place when the seat belt attachment point is translated one or more of forwards and downwards with respect to the interior structure of the vehicle responsive to an electronic control system of the vehicle detecting an impending braking or impact event.

17. A non-transitory computer readable medium stored on a computer and executed by a processor to implement the step(s) comprising:
responsive to a seat back of a vehicle being reclined, actuating a translation mechanism coupled to a seat belt attachment point to translate the seat belt attachment point one or more of forwards and downwards with respect to an interior structure of the vehicle;
wherein the seat belt attachment point adapted to receive one of a seat belt retention assembly and a seat belt buckle assembly; and
actuating a locking mechanism to secure the seat belt attachment point in place when the seat belt attachment point is translated one or more of forwards and downwards with respect to the interior structure of the vehicle responsive to the seat back of the vehicle being reclined.

18. The non-transitory computer readable medium of claim 17, wherein the translation mechanism comprises an electronic actuator coupled between the seat back and the seat belt attachment point, and wherein the electronic actuator comprises:
a sensor mechanism adapted to sense a recline angle, a, of the seat back; and
an actuation mechanism coupled to the sensor mechanism and adapted to translate the seat belt attachment point one or more of forwards and downwards with respect to the interior structure of the vehicle responsive to the seat back being reclined.

19. The non-transitory computer readable medium of claim 17, wherein the translation mechanism is actuated to translate the seat belt attachment point one or more of forwards and downwards with respect to the interior structure of the vehicle responsive to the seat back of the vehicle being reclined and an electronic control system of the vehicle detecting an impending braking or impact event.

20. The non-transitory computer readable medium of claim 17, the steps further comprising actuating the locking mechanism to secure the seat belt attachment point in place when the seat belt attachment point is translated one or more of forwards and downwards with respect to the interior structure of the vehicle responsive to the seat back of the vehicle being reclined and an electronic control system of the vehicle detecting an impending braking or impact event.

* * * * *